US011004449B2

(12) United States Patent
Bender et al.

(10) Patent No.: US 11,004,449 B2
(45) Date of Patent: May 11, 2021

(54) VOCAL UTTERANCE BASED ITEM INVENTORY ACTIONS

(71) Applicant: International Business Machines Corporation, Armonk, NY (US)

(72) Inventors: Michael Bender, Southbury, CT (US); Jeremy R. Fox, Austin, TX (US); Kulvir Bhogal, Coppell, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 16/204,880

(22) Filed: Nov. 29, 2018

(65) Prior Publication Data

US 2020/0175973 A1 Jun. 4, 2020

(51) Int. Cl.
*G10L 15/22* (2006.01)
*G06N 5/02* (2006.01)
*G06N 20/00* (2019.01)
*G06Q 10/08* (2012.01)
*G10L 15/18* (2013.01)
*G06Q 50/00* (2012.01)

(52) U.S. Cl.
CPC .............. *G10L 15/22* (2013.01); *G06N 5/022* (2013.01); *G06N 20/00* (2019.01); *G06Q 10/087* (2013.01); *G06Q 50/01* (2013.01); *G10L 15/1815* (2013.01); *G10L 2015/223* (2013.01)

(58) Field of Classification Search
CPC .................. G10L 15/22; G10L 15/1815; G10L 2015/223; G06N 5/022; G06N 20/00; G06Q 10/087; G06Q 50/01
See application file for complete search history.

(56) References Cited

U.S. PATENT DOCUMENTS

| 7,756,755 | B2 | 7/2010 | Ghosh et al. |
| 8,775,230 | B2 * | 7/2014 | Casas ................. G06Q 30/0202 705/7.31 |
| 9,009,592 | B2 | 4/2015 | Friend et al. |
| 9,098,871 | B2 * | 8/2015 | Argue ..................... G06T 7/00 |
| 9,239,987 | B1 * | 1/2016 | Tsao .................... G06Q 30/0251 |
| 9,324,042 | B2 * | 4/2016 | Agarwal ............ G06Q 30/0641 |
| 10,102,855 | B1 * | 10/2018 | Sindhwani ......... G06Q 30/0635 |

(Continued)

FOREIGN PATENT DOCUMENTS

WO WO2017078635 5/2017

OTHER PUBLICATIONS

P. Mell, et al. "*The NIST Definition of Cloud Computing*", NIST Special Publication 800-145, Sep. 2011, Gaithersburg, MD.

(Continued)

*Primary Examiner* — Anne L Thomas-Homescu
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: obtaining vocal utterance data representing vocal utterances of multiple users within a venue; processing the vocal utterance data to return metadata associated to the vocal utterance data; predicting using the metadata an item for acquisition by one or more user of the multiple users; and returning an action decision in dependence on the predicting.

20 Claims, 8 Drawing Sheets

(56) References Cited

U.S. PATENT DOCUMENTS

| | | | | |
|---|---|---|---|---|
| 10,366,349 | B1* | 7/2019 | Podgorny | G06Q 50/00 |
| 10,424,297 | B1* | 9/2019 | Carino | G10L 25/78 |
| 10,755,715 | B2* | 8/2020 | Huang | G06F 3/02 |
| 2009/0006181 | A1* | 1/2009 | Ghosh | G06Q 30/02 |
| | | | | 705/26.1 |
| 2012/0035925 | A1* | 2/2012 | Friend | G06F 3/167 |
| | | | | 704/235 |
| 2012/0136741 | A1 | 5/2012 | Agarwal | |
| 2014/0095479 | A1* | 4/2014 | Chang | G06F 16/335 |
| | | | | 707/722 |
| 2014/0214601 | A1* | 7/2014 | Argue | G06T 7/00 |
| | | | | 705/26.8 |
| 2014/0379524 | A1* | 12/2014 | Grimaud | G06Q 30/0601 |
| | | | | 705/26.41 |
| 2015/0039413 | A1* | 2/2015 | Winkler | G06Q 30/0234 |
| | | | | 705/14.34 |
| 2015/0073907 | A1* | 3/2015 | Purves | G06Q 20/384 |
| | | | | 705/14.58 |
| 2015/0358414 | A1* | 12/2015 | Mehta | G06Q 10/109 |
| | | | | 705/5 |
| 2016/0071517 | A1* | 3/2016 | Beaver | G10L 15/22 |
| | | | | 704/9 |
| 2017/0084295 | A1* | 3/2017 | Tsiartas | G10L 17/02 |
| 2017/0140285 | A1* | 5/2017 | Dotan-Cohen | G06F 3/038 |
| 2017/0177712 | A1* | 6/2017 | Kopru | G06F 16/3337 |
| 2017/0255793 | A1* | 9/2017 | Caldwell | G06F 21/31 |
| 2017/0255985 | A1* | 9/2017 | Acott | G06Q 30/0633 |
| 2018/0108192 | A1* | 4/2018 | Ho | G06K 9/00288 |
| 2018/0174130 | A1* | 6/2018 | Shroff | G06Q 30/0267 |
| 2018/0205726 | A1* | 7/2018 | Chari | G10L 17/02 |
| 2018/0246967 | A1* | 8/2018 | Hill | G06F 16/951 |
| 2018/0285094 | A1* | 10/2018 | Housel | G06F 9/4401 |
| 2018/0285902 | A1* | 10/2018 | Nazarian | G06F 15/76 |
| 2018/0330196 | A1* | 11/2018 | Chaubard | G06T 7/11 |
| 2018/0330315 | A1* | 11/2018 | Gurumohan | H04L 67/12 |
| 2019/0025820 | A1* | 1/2019 | Ferguson | G08G 1/0175 |
| 2019/0033856 | A1* | 1/2019 | Ferguson | G06N 20/00 |
| 2019/0095757 | A1* | 3/2019 | Sugiura | G06F 21/60 |
| 2019/0096407 | A1* | 3/2019 | Lambourne | G11B 27/031 |
| 2019/0114693 | A1* | 4/2019 | Zhang | G06Q 30/0637 |
| 2019/0130416 | A1* | 5/2019 | Boudville | G06Q 20/1085 |
| 2019/0155917 | A1* | 5/2019 | Zuluaga | G06Q 30/06 |
| 2019/0180175 | A1* | 6/2019 | Meteer | G06F 3/04812 |
| 2019/0213212 | A1* | 7/2019 | Adato | G06T 7/13 |
| 2019/0236652 | A1* | 8/2019 | Kaul | G06Q 30/0269 |
| 2019/0238928 | A1* | 8/2019 | Filmeyer | H04N 21/4333 |
| 2019/0279625 | A1* | 9/2019 | Huang | G06F 3/04847 |
| 2019/0294879 | A1* | 9/2019 | Tibau-Puig | G06K 9/6256 |
| 2019/0294974 | A1* | 9/2019 | Clark | G10L 13/00 |
| 2019/0303611 | A1* | 10/2019 | Lefor | G06F 16/2465 |
| 2019/0306137 | A1* | 10/2019 | Isaacson | G06Q 20/40 |
| 2019/0306549 | A1* | 10/2019 | Dietz | G06Q 30/0201 |
| 2019/0325498 | A1* | 10/2019 | Clark | G06K 7/1417 |
| 2019/0387060 | A1* | 12/2019 | Kentley-Klay | H04L 67/306 |
| 2020/0005341 | A1* | 1/2020 | Marsh | G06Q 40/00 |
| 2020/0005661 | A1* | 1/2020 | Armstrong | F41G 3/26 |
| 2020/0065420 | A1* | 2/2020 | Scodary | G06F 16/9535 |
| 2020/0097908 | A1* | 3/2020 | Glasfurd | G01C 21/3492 |
| 2020/0104869 | A1* | 4/2020 | Oh | G06F 16/90324 |
| 2020/0118560 | A1* | 4/2020 | Kim | G10L 15/1815 |
| 2020/0126037 | A1* | 4/2020 | Tatituri | G06N 20/00 |
| 2020/0142888 | A1* | 5/2020 | Alakuijala | G06F 16/3338 |
| 2020/0143813 | A1* | 5/2020 | Nakagawa | G10L 21/12 |
| 2020/0251098 | A1* | 8/2020 | Metallinou | G10L 15/197 |

OTHER PUBLICATIONS

Google, Amazon Patent Filings Reveal Digital Home Assistant Privacy Problems Retreived from http://www.consumerwatchdog.org/sites/default/files/201712/Digital%20Assistants%20and%20Privacy.pdf.

* cited by examiner

VOCAL UTTERANCE BASED ITEM INVENTORY ACTIONS

TECHNICAL FIELD

The invention relates to artificial intelligence (AI) action decisions in general and in particular to AI action decisions in dependence on vocal utterances.

BACKGROUND

Speech recognition is the translation of spoken words to text and, more particularly, it is the computer-driven transcription of spoken language into readable text in real-time. Speech recognition systems are rapidly increasing in significance in many areas of data and communications technology. In recent years, speech recognition has advanced to the point where it is used by millions of people across various applications. Speech recognition applications now include interactive voice response systems, voice dialing, data entry, dictation mode systems including medical transcription, automotive applications, etc. There are also "command and control" applications that utilize speech recognition for controlling tasks such as adjusting the climate control in a vehicle or requesting a smart phone to play a particular song.

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience.

SUMMARY

Shortcomings of the prior art are overcome, and additional advantages are provided, through the provision, in one aspect, of a method. The method can include, for example: obtaining vocal utterance data representing vocal utterances of multiple users within a venue; processing the vocal utterance data to return metadata associated to the vocal utterance data; predicting using the metadata an item for acquisition by one or more user of the multiple users; and returning an action decision in dependence on the predicting.

In another aspect, a computer program product can be provided. The computer program product can include a computer readable storage medium readable by one or more processing circuit and storing instructions for execution by one or more processor for performing a method. The method can include, for example: obtaining vocal utterance data representing vocal utterances of multiple users within a venue; processing the vocal utterance data to return metadata associated to the vocal utterance data; predicting using the metadata an item for acquisition by one or more user of the multiple users; and returning an action decision in dependence on the predicting.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining vocal utterance data representing vocal utterances of multiple users within a venue; processing the vocal utterance data to return metadata associated to the vocal utterance data; predicting using the metadata an item for acquisition by one or more user of the multiple users; and returning an action decision in dependence on the predicting.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
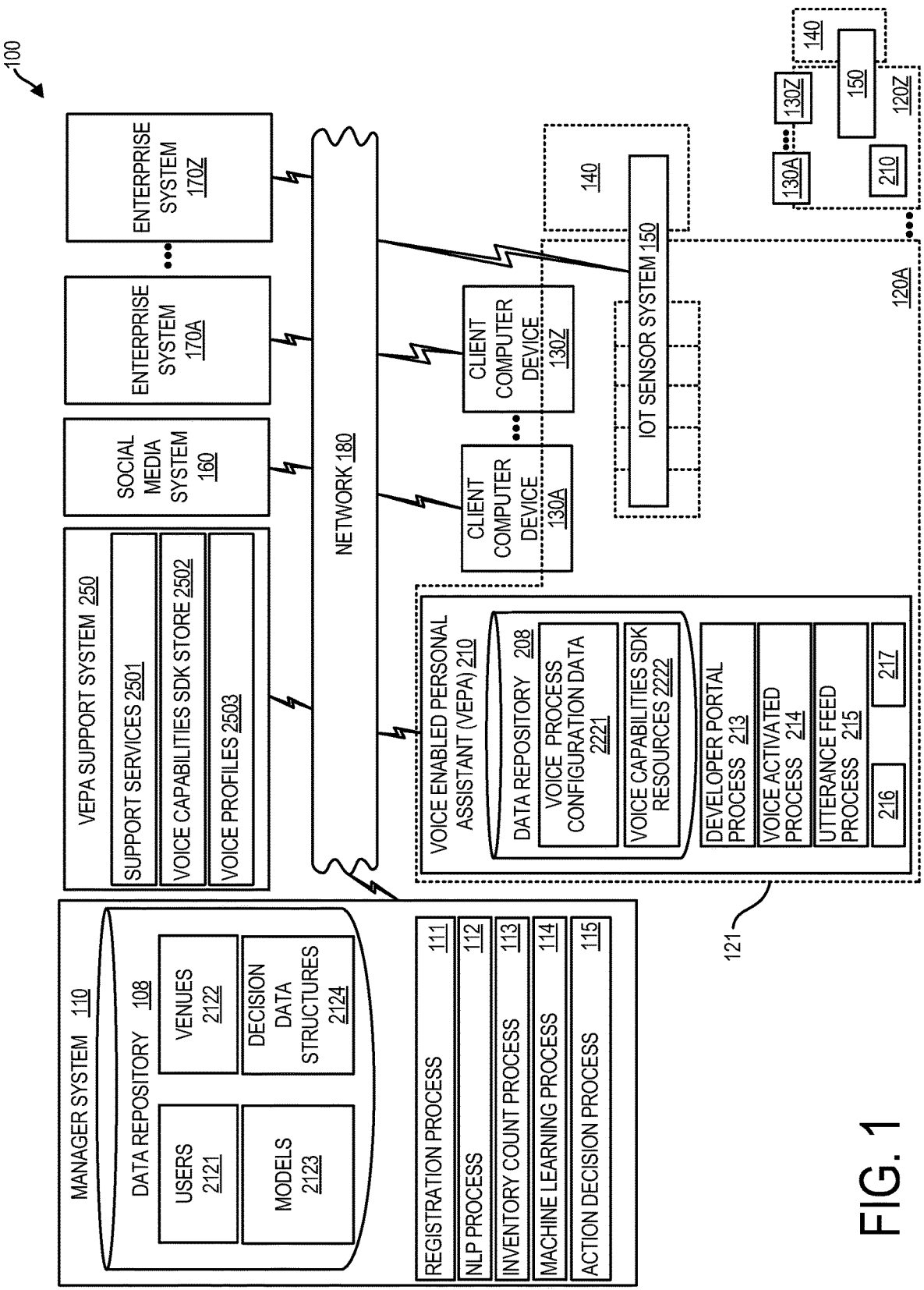
FIG. 1 is a block diagram of a system having a manager system, a voice enabled personal assistant (VEPA), a VEPA support system, client computer devices, an IoT sensor system, a social media system, and enterprise systems according to one embodiment.

System 100 for use in item inventory control is shown in FIG. 1. System 100 can include manager system 110 having an associated data repository 108, voice enabled personal assistant (VEPA) 210, client computer devices 130A-130Z, IoT sensor system 150, social media system 160, enterprise systems 170A-170Z, VEPA support system 250 associated to VEPA 210. Manager system 110, VEPA 210, VEPA support system 250, client computer devices 130A-130Z, IoT sensor system 150, social media system 160, and enterprise systems 170A-170Z can be in communication with one another via network 180. Network 180 may be a physical network and/or a virtual network. A physical network can be, for example, a physical telecommunications network connecting numerous computing nodes or systems, such as computer servers and computer clients. A virtual network can, for example, combine numerous physical networks or parts thereof into a logical virtual network. In another example, numerous virtual networks can be defined over a single physical network.

System 100 can include numerous devices which can be computing node based devices connected by and in communication with one another via network 180. According to one environment, each of manager system 110, VEPA 210, VEPA support system 150, client computer devices 130A-130Z, IoT sensor system 150, social media system 160, and enterprise systems 170A-170Z can be external to and remote from one another. According to one embodiment, one or more of manager system 110, VEPA 210, VEPA support system 150, respective client computer devices 130A-130Z, IoT sensor system 150, social media system 160, and respective enterprise systems 170A-170Z can be collocated with one another.

VEPA 210 can run various processes including developer portal process 213, which can support development of code that configures a voice activated process. VEPA 210 can also run one or more voice activated process 214 based on code developed using developer portal process 213.

VEPA 210 can be configured to support one or more voice activated processes 214. In one example, a voice activated process 214 can be a process wherein a directive is invoked in response to a vocal utterance of a user. In one embodiment, a directive invoked by a vocal utterance can be responded to by a service as will be set forth in greater detail herein.

VEPA 210 running vocal utterance feed process 215 can collect vocal utterances of users within venue 120A and can send, e.g. a streaming representation of vocal utterances for processing by manager system 110. VEPA 210 can include audio input device 216 and audio output device 217.

Data repository 108 of VEPA 210 can store various data, such as voice process configuration data stored in voice process configuration data area 2121, developed for support in configuration of various voice activated processes. Data repository 108 can also store voice capabilities software development kit (SDK) resources into voice capabilities SDK resources area 2122.

For running of developer portal process 213, VEPA 210 can use resources of voice capabilities SDK resources area 2122. VEPA 210 can support a plurality of different voice activated processes. Voice activated processes can be developed e.g. for control of home appliances, home climate control, home video equipment, voice activation of purchase transactions, e.g. with retail or restaurant establishments, and voice activated music listening services. Different voice capabilities SDK resources that are stored in voice capabilities SDK resources area 2122 can be provided for the development and support of different classifications of voice processes. For example, development of several different voice activated processes, e.g. for control of home appliances, might be developed and supported with use of a voice capabilities SDK resources of voice capabilities SDK resources area 2122 optimized for home related voice activated processes. A plurality of home video related voice activated processes can be developed and supported with use of voice capabilities SDK resources of voice capabilities SDK resource area 2122 optimized for support of video related voice activated processes. Additional voice capabilities SDK resources can be added to voice capabilities SDK resources area 2122 of data repository 108 (e.g. downloaded from an SDK store as set forth herein) to increase the capacities and classifications of voice activated processes that are supported.

VEPA support system 250 can support functions of VEPA 210. VEPA support system 250 can be operated by an enterprise that provides VEPA 210. VEPA support system 250 can provide support services 2501 for support of operations by VEPA 210 and can include voice capabilities SDK store 2502. Using an administrator user interface of administrator client computer 230 an administrator user can view the contents of voice capabilities SDK store 2502 and download additional SDK resources into voice capabilities SDK resources area 2122 of VEPA. Support services 2501 provided by VEPA support system 250 can include such services as voice natural language processing (NLP) services for converting and processing of voice data that can be generated locally at VEPA 210 in response to vocalizations by users at the location of VEPA 210. VEPA support system 250 can include a voice profiles area 2503. In voice profiles area 2503, VEPA support system 250 can store data of voice tendencies of users of VEPA 210, based on use of VEPA 210 over time. System 100 can learn tendencies of a user's voice including, e.g. accent, volume, tone, inflection, and can use such classifications to recognize speech of the user.

In one embodiment, VEPA 210 can be provided, e.g., by an ALEXA® personal assistant (ALEXA® is a registered trademark of Amazon.com, Inc. Seattle, Wash.). In one embodiment, VEPA 210 can be provided by a HOMEPOD® intelligent personal assistant, available from Apple, Inc. (HOMEPOD is a registered trademark of Apple, Inc. of Cupertino, Calif.). Embodiments herein can provide functionality for use in the development of voice activated processes, wherein vocal utterances invoke directives to direct the execution of commands for performance of computer system functions such as file or directory management command functions.

System 100 can include a plurality of venues, such as venues 120A-120Z, as depicted in FIG. 1. Each venue of the respective venues 120A-120Z can have an associated VEPA 210, associated respective client computer devices 130A-130Z, respective one or more vehicle 140, and a respective IoT sensor system 150, e.g. partially distributed in venue 120A and partially distributed in vehicle 140.

Each client computer device of client computer devices 130A-130Z can be associated to a certain user. Each of the different client computer devices 130A-130Z can be associated to a different user. Regarding client computer devices 130A-130Z, a computer devices of the client computer devices 130A-130Z according to one embodiment can be a computing node based device provided by a client computer, e.g. a mobile device such as a smartphone, tablet, laptop, smartwatch, or a PC that runs one or more program, e.g. including a web browser for opening and viewing webpages, such as webpages for support of graphical user interface (GUI) functionality.

Social media system 160 can include a collection of files, including for example, HTML files, CSS files, image files, and JavaScript files. Social media system 160 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that have minimal or no social network attributes. A messaging system can be provided by a short message system (SMS) text message delivery service of a mobile phone cellular network provider, or an email delivery system. Manager system 110 can include a messaging system in one embodiment.

Enterprise systems 170A-170Z can be respectively associated to different enterprises such as retail store enterprises, e.g. including enterprises having one or more online retail store and/or one or more brick and mortar retail store, hospitality enterprises, e.g. for hotel services and/or restaurant services, financial services enterprises, government enterprises, and the like.

Data repository 108 can store various data. In users area 2121 data repository 108 can store data on users of system 100. Users can be associated to respective ones of client computer devices 130A-130Z. Users can be associated to a certain venue. For example, there can be a first set of users associated to a first venue and a second set of users associated to a second venue. A user herein, for example, can be an owner or occupant of a venue of venues 120A-120Z. A user can be an operator of VEPA 210 who uses developer portal process 213 of VEPA 210 to configure new voice activated processes run with use of VEPA 210. Users can be registered users of system 100. On registration into system 100, a user can receive services provided by system 100 and can grant various permissions to system 100. The permissions can include, e.g. access rights to vocal utterance data within venue 120A, access rights to content of social media system 160, e.g. an account of a registered user within social media system 160. In granting system 100 access rights to use vocal utterance data originating from within venue 120A, a user can place limits on such rights. According to one example, a user can permit system 100 rights to metadata tags returned by processing of vocal utterance data, but not the underlying vocal utterance data. Underlying vocal utterance data herein can refer to, e.g. audio recordings of vocal utterances and text based transcripts of vocal utterances returned by subjecting vocal utterance data to speech-to-text conversion processing. Manager system 110 can store data in users area 2121 of data repository 108 based on permissions to store data granted by respective users of system 100. Manager system 110 can include an opt-in/opt-out mechanism that allows a user to opt-out of a prior permission to store user data. System 100 can be configured so that responsively to a user opting out of a prior permission to store user data, the user data of the opting out user is automatically and permanently deleted from data repository 108.

Data repository 108 in venues area 2122 can store data on venues of system 100. Manager system 110, according to one embodiment, can provide services to various users at different venues. For example, the venues 120A-120Z depicted in FIG. 1. Venues area 2122 can include such data as the geocoordinates of various venues universal unique identifiers (UUIDs) assigned to such venue. Data tags associated to such venues, e.g. referencing a type of venue, e.g. residence or enterprise.

Data repository 108 in models area 2123 can store predictive models used by manager system 110 for return of action decision. Models in models area 2123 can be models that are trained using machine learning processes.

Data repository in decision data structures area 2124 can store decision data structures for use by manager system 110 for return of action decisions. Decision data structures stored in decision data structures area 2124 can include, e.g. decision tables and/or decision trees.

Referring to FIG. 1, VEPA 210 can be disposed within a venue 120A. Venue 120A can be, e.g. a residence venue or an enterprise venue. Client computer devices 130A-130Z can be client computer devices associated to various respective users. Client computer devices 130A-130Z can be mobile client computer devices that are moveable between locations that are external to venue 120A and/or internal to venue 120A. Geofence 121 can be a geospatial perimeter associated to venue 120A that specifies the geospatial location of venue 120A.

IoT sensor system 150 can include a plurality of IoT sensor devices, e.g. as may be provided by cameras, weight sensors, temperature sensors, humidity sensors, pressure sensors, and the like. The IOT sensor devices can be disposed to sense the presence or absence of items. IoT sensor devices defining IoT sensor system 150 can be distributed partially within venue 120A and can be disposed partially externally to venue 120A. According to one embodiment, IoT sensor system 150 can include one or more IoT sensor device disposed within a vehicle 140 wherein vehicle 140 is associated to venue 120A. According to one embodiment, venue 120A is provided by a residence and vehicle 140 can be a vehicle associated to a residence, e.g. the household car.

Embodiments herein recognize that vocal utterances by users can be useful in predicting future actions of users. For example, an vocal utterance of a user such as "we are running low on milk" can be a predictor that a user will acquire milk in the near future. A vocal utterance provided by a sneeze can be a predictor that user will acquire medicine. Embodiments herein recognize that by intelligently monitoring the correlations between vocal utterances and actions, accurate predictions of item acquisitions can be provided.

Manager system 110 can run various processes. Manager system 110 running registration process 111 can register users so that users can receive services provided by system 100 in manager system 110. Manager system 110 running registration process 111 can include manager system distributing installation packages for running on client computer devices 130A-130Z and VEPA 210 to configure client computer devices 130A-130Z and VEPA 210 to function in support of the services provided by system 100. Installation packages can include, e.g. libraries and executable code. Manager system 110 running registration process 111 can respond to permissions granted by a user in response to sending of registration data by a user. Permissions granted by a user can include, e.g. permissions to use vocal utterance data presenting vocal utterances entered into VEPA 210 and permissions in respect to data of social media system 160, e.g. social media account information of a user. Data permissions can be limited. For example, a user according to one embodiment can permit manager system 110 to process data representing vocal utterances entered into VEPA 210, but manager system 110 can destroy payload data after payload data is subject to processing for return of data tags.

Manager system 110 running natural language processing (NLP) process 112 can include manager system 110 processing data for preparation of records that are stored in data repository 108 and for other purposes. Manager system 110 can run a Natural Language Processing (NLP) process 112 for determining one or more NLP output parameter of a message. NLP process 112 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter.

By running of NLP process 112 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message.

Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text at the document, sentence, or feature/aspect level—whether the expressed opinion in a document, a sentence or an entity feature/aspect is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness."

Manager system 110 running NLP process 112 can include manager system 110 using custom configured NLP resources. According to one embodiment, manager system 110 running NLP process 112, can include manager system 110 querying support services 2501 of VEPA support system 250 for return of NLP data tags provided by support services 2501.

Manager system 110 running inventory count process 113 can include manager system 110 maintaining a running count of an inventory of items included within venue 120A. The items can include household items in the case that venue 120A is provided by a residence. Examples of inventory items can include, e.g. food items and other household items commonly included within a venue provided by a residence venue. The items can include commonly replaced items according to one embodiment. Manager system 110 running inventory count process 113 can include manager system 110 processing data from a variety of data sources such as IoT sensor devices defining IoT sensor system 150, data from client computer devices 130A-130Z, data from enterprise systems 170A-170Z. Manager system 110 running inventory count process 113 can maintain a running count of an inventory of items included within venue 120A. Manager system 110 running inventory count process 113 can have provisions so that additions to an item inventory are not counted more than once.

Manager system 110 running machine learning process 114 can iteratively train various predictive models for use in return of action decisions. According to one embodiment manager system 110 can train a predictive model with use of data return by running of NLP process 112 and data returned by running of inventory count process 113. Manager system 110 running machine learning process 114 can train a predictive model to predict future acquisitions of inventory in dependence on vocal utterances by users within venue 120A.

Manager system 110 running action decision process 115 can return an action decision in dependence on a prediction that an item will be acquired for inclusion in venue 120A. According to one embodiment manager system 110 running action decision process 115 can return an action decision in dependence, e.g. on a fair market value (FMV) of an acquired item and/or in dependence on a confidence level associated with a prediction that an item will be acquired.

Figure 2:
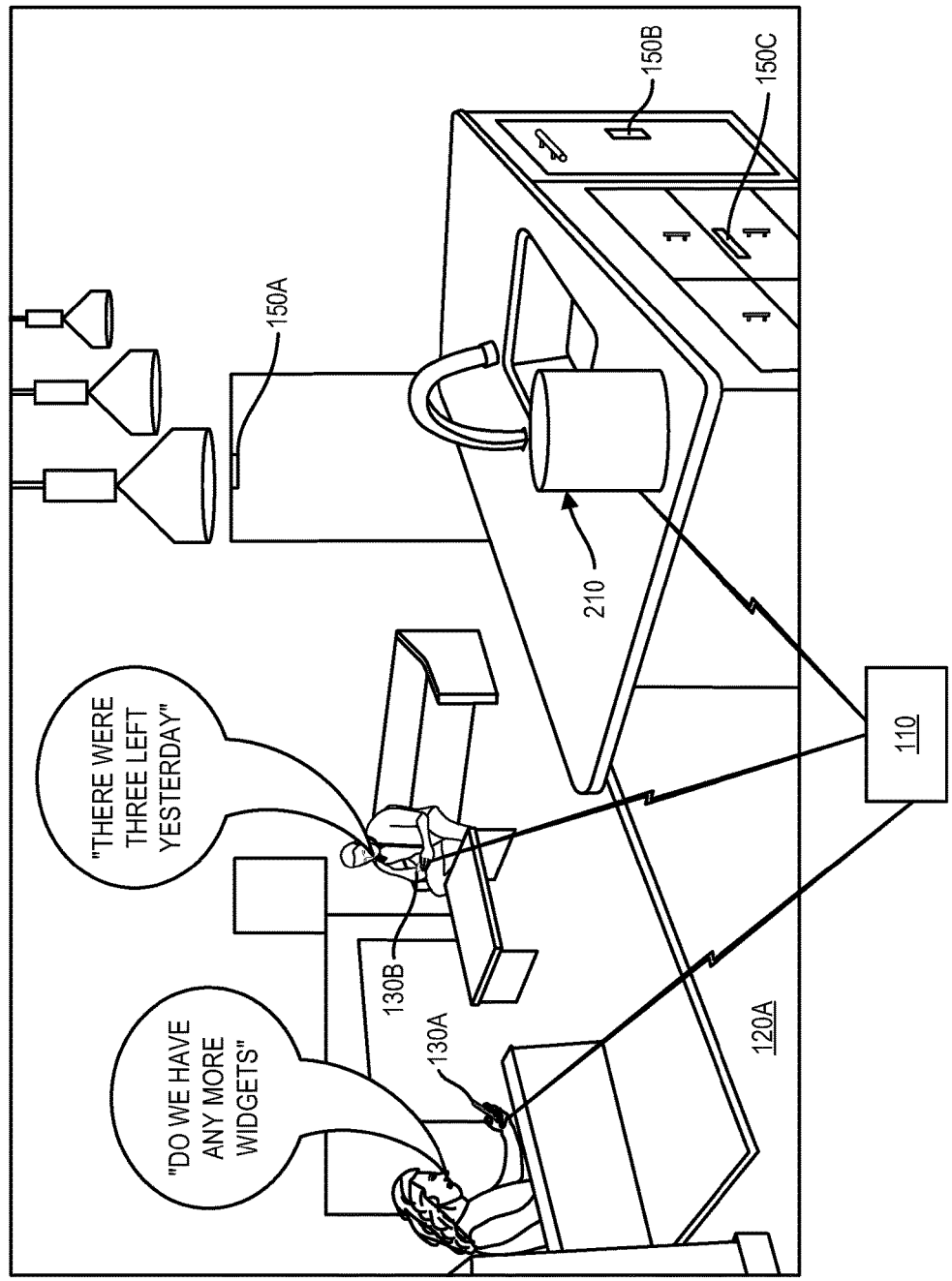
FIG. 2 is a physical schematic view of a system as shown in FIG. 1 according to one embodiment.

FIG. 2 depicts a physical schematic view of system 100 as described in connection with FIG. 1. As indicated in FIG. 2. VEPA 210 can be located at a commonly travelled location of a venue 120A, e.g. a kitchen area as depicted in the example of FIG. 2, where venue 120A is provided by a residence venue. VEPA 210 can be configured to iteratively and passively process all vocal utterances of users such as the users shown including the user using client computer device 130A and the user using client computer device 130B, both provided by mobile client computer devices.

Manager system 110 can be monitoring vocal utterance data representing vocal utterances by users such as the user shown and can also be processing at all times other various data such as data from client computer devices 130A and 130B and data from IoT sensor devices defining IoT sensor system 150, such as IoT sensor device 150A, IoT sensor device 150B, and IoT sensor device 150C. IoT sensor devices 150A-150C in the example shown can be disposed for support of inventory count process 113, i.e. can be disposed for use in ascertaining whether an inventory count for an item has increased or decreased. IoT sensor device 150A can be provided by a camera for use in detecting all items carried into venue 120A or carried out of venue 120A. IoT sensor device 150B can be an IoT sensor device, e.g. camera based for detecting items within a refrigerator. IoT sensor device 150C can be an IoT sensor device, e.g. camera based, disposed for detection of inventory items within a cupboard.

Manager system 110 can be processing data obtained from other data sources as explained in connection with FIG. 1. According to some of its capabilities, VEPA 210 can be configured to respond to active vocal utterances of users which can be vocal utterances intended by a user to invoke a directive for triggering of function associated with a voice-activated process. Voice-activated processes that can be developed for use with VEPA 210 can include voice-activated processes for control of home appliances, home climate control, home video equipment, voice-activation of purchase transactions, voice-activated music listening services. VEPA 210 can be responsive to a "wake word" which is a special word (often a personal name) reserved for use with VEPA 210 which, when spoken, can activate a mode in which VEPA 210 expects a following word to be a directive invoking word.

System 100 can be configured to process vocal utterances including passive vocal utterances which, herein, can refer to vocal utterances that are not intended by a user to invoke a directive. Vocal utterance representations subject to processing herein can include representations of vocal utterances of background vocal utterances, i.e. conversations between two or more user persons conducted without the intent of invoking a directive and without utterance of a "wake word". Vocal utterance representation subject to processing can include ambient background vocal utterances, e.g. conversations between two or more people and can include non-speech vocal utterances such as coughing and sneezing.

Manager system 110 can be configured to process vocal utterance representing data for return of return parameters such as NLP output parameters. Manager system 110 can also be configured to process data from IoT sensor devices, e.g. sensor devices 150A-150C and other data sources for update of an inventory list. Manager system 110 can use returned processing parameters such as NLP output parameters and inventory data for use in training a predictive model. Manager system 110 can query the trained predictive model for return of a prediction as to one or more item to be acquired. Manager system 110 can return an action decision in dependence on a predicted item for acquisition. Manager system 110 can provide one or more output to perform an action in accordance with a returned action decision.

Figure 3:
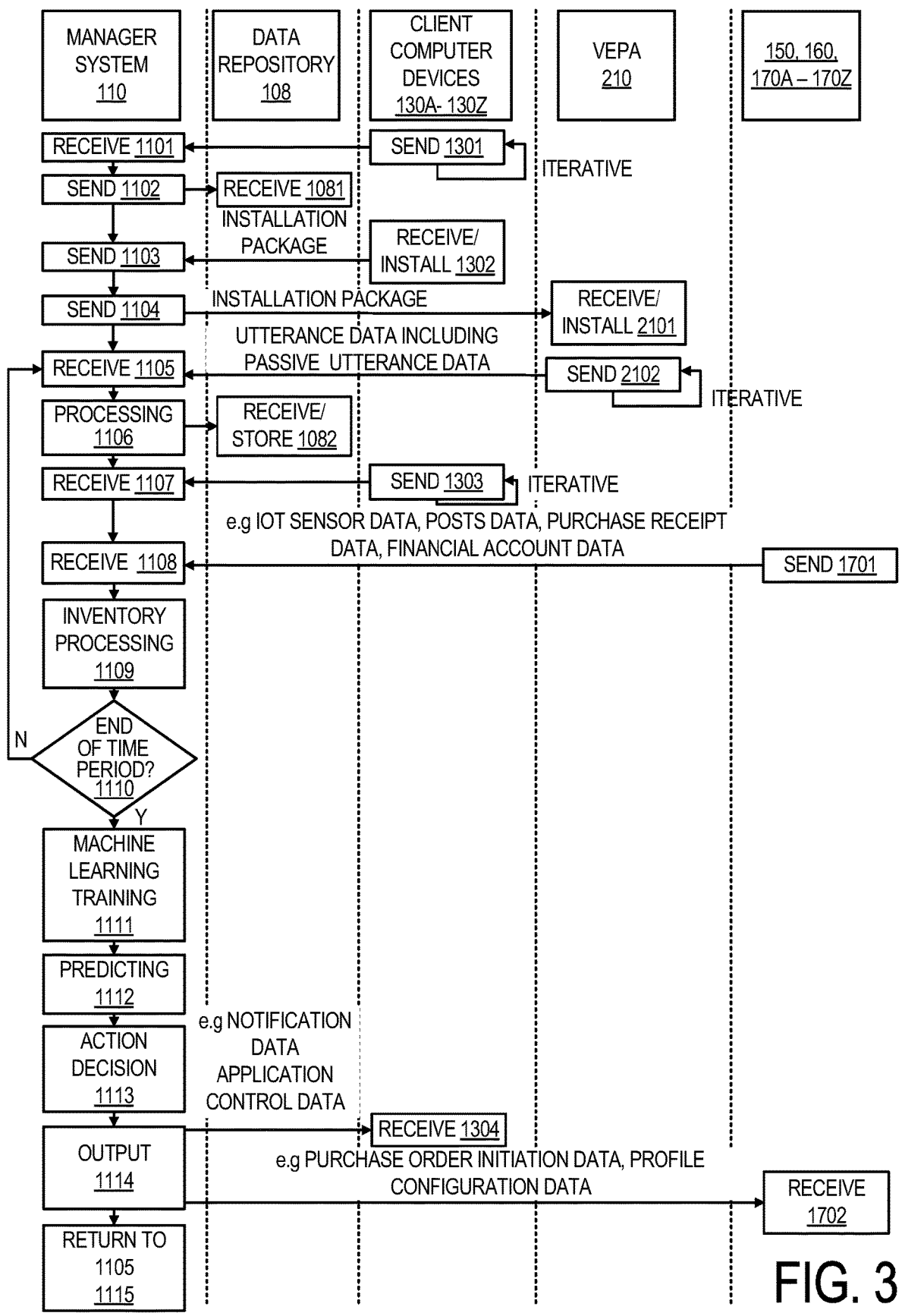
FIG. 3 is a flowchart illustrating a method that can be performed by a manager system interoperating with various other components according to one embodiment.

FIG. 3 is a flowchart illustrating performance of a method performed by manager system 110 interoperating with client computer devices 130A, VEPA 210, and components 150, 160, and 170A-170Z. At block 1301, client computer devices 130A-130Z can be sending registration data for receipt by manager system 110 at block 1101.

Figure 4:
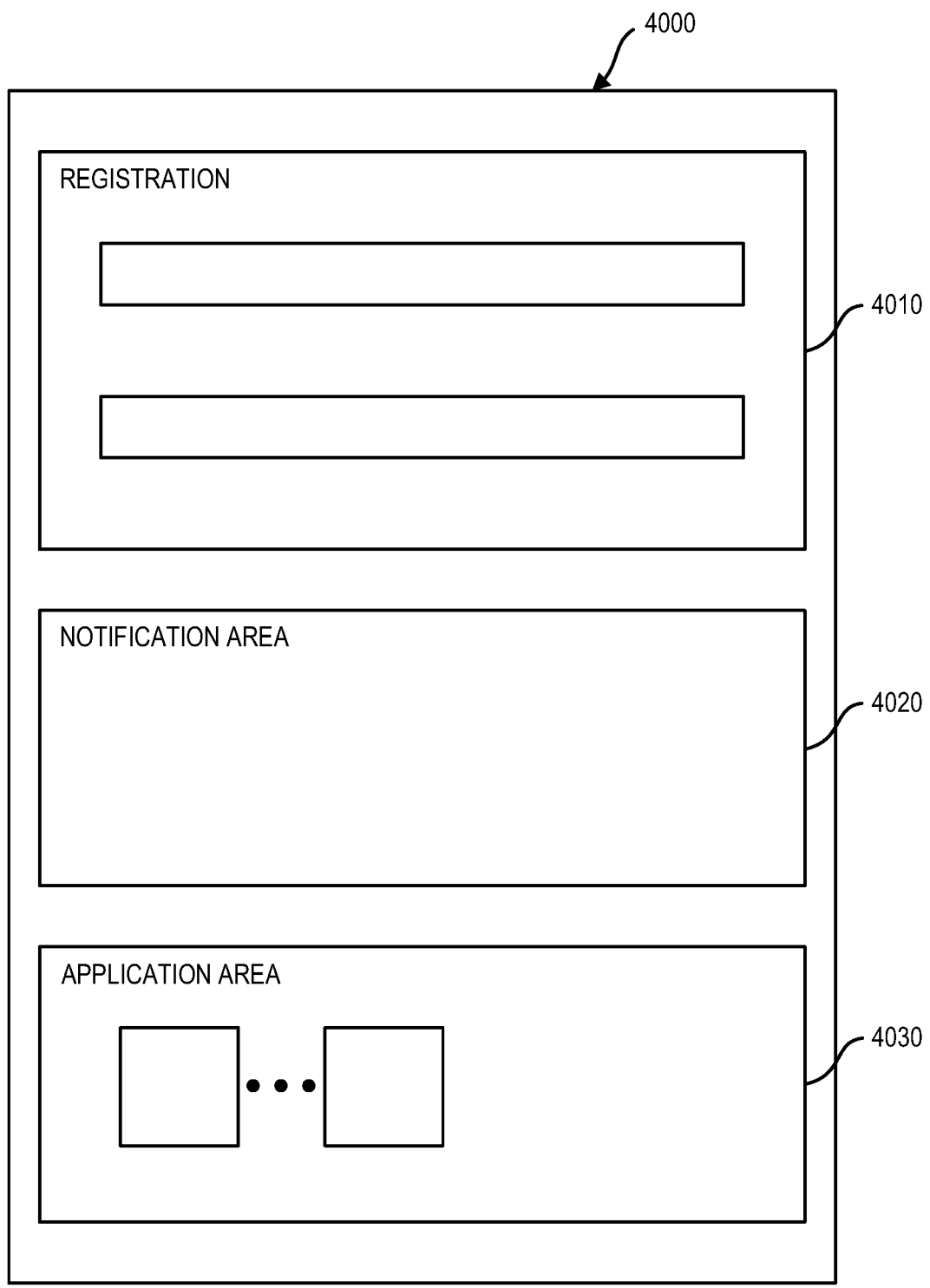
FIG. 4 depicts a user interface for display on a client computer device and for use by a user of a client computer device according to one embodiment.

For defining registration data a user can be using user interface 4000 as set forth in FIG. 4. User interface 4000 can be a displayed user interface for display on a display of a respective computer device of client computer devices 130A-130Z. In registration area 4010 of user interface 4000 a user can enter contact information, e.g. name, address, e-mail address, social media account information, and the like. Registration data entered into registration area 4010 can include other information such as whether the user is an operator of a VEPA 210 as shown in FIGS. 1-2 and whether the user is an owner or occupant of a venue such as venue 120A which can be a residence venue.

Registration data entered into area 4010 can also include registration data that specifies permissions in respect to data of a user which is accessible by manager system 110. Permissions can include, e.g. permissions specifying that manager system 110 can process vocal utterance representing data that represents vocal utterances within venue 120A. According to one example, a user can grant permission to manager system 110 to process vocal utterance data that represents vocal utterances within venue 120A but is required to delete such data when processing has been completed for extraction of metadata, which metadata may be maintained and not deleted by manager system 110. Permissions can also specify that manager system 110 can access data of social media system 160, i.e. account information of a user who is a user of social media system 160. A permission in respect to social media system 160 can grant manager system 110 the right to access social media account information including social media posts data of a user. Permissions can include permissions to recover from client computer devices 130A-130Z data from applications running on client computer devices such as shopping assistance, client applications, online retail store applications, banking applications, which can include such information as credit or debit card transactions of a user. System 100 can be configured so that a user can opt out of a permission grant. System 100 can be configured so that responsively to a user opting out of a permission all user data of that user is deleted.

In response to receipt of registration data at block 1101, manager system 110 can assign a user a universally unique identifier (UUID) and can proceed to block 1102. At block 1102, manager system 110 can send registration data to data repository 108 for receipt and storage by data repository 108 at block 1081. In response to completion of block 1102, manager system 110 can proceed to blocks 1103 and 1104.

At block 1103, manager system 110 can send an installation package to client computer devices 130A-130Z for receipt and installation on client computer devices 130A-130Z at block 1302. An installed installation package can include, e.g. libraries and executable code facilitating functioning of client computer devices 130A-130Z in system 100. Functionalities facilitated can include functionalities to allow manager system 110 to recover from client computer devices 130A-130Z data from applications running on client computer devices such as shopping assistance, client applications, online retail store applications, banking applications, which can include such information as credit or debit card transactions of a user. System 100 can be configured so that a user can opt out of a permission grant. System 100 can be configured so that responsively to a user opting out of a permission all user data of that user is deleted.

At block 1104 manager system 110 can send an installation package for receipt and installation on VEPA 210 at block 2101. The installation package can include, e.g. libraries and executable code facilitating VEPA 210 functioning support services provided by system 100. Installation of the installation package received at block 2101 can result in vocal utterance feed process 215 (FIG. 1) being enabled. VEPA 210 can send vocal utterance data representing user vocal utterances to manager system 110 for processing, e.g. as streaming audio data and/or as streaming text data where VEPA 210 locally performs voice-to-text processing. VEPA 210 can receive vocal utterances from users through audio input device 216 and can present audio prompts to users through audio output device 217. With an installation package installed, VEPA 210 can proceed to block 2102.

At block 2102, VEPA 210 can be iteratively sending vocal utterance data for receipt by manager system 110 at block 1105. As noted, the vocal utterance data can be in the form of a streaming vocal utterance representation, e.g. in voice form and/or in text form. On receipt of vocal utterance data by manager system 110 at block 1105, manager system 110 can proceed to block 1106.

At block 1106, manager system 110 can process received vocal utterance data. Manager system 110 at block 1106 can activate NLP process 112 to subject a vocal utterance representation stream to NLP processing. Manager system 110 subjecting a streaming vocal utterance representation to NLP processing at block 1106 can include manager system 110 as a result of such processing, providing metadata tags associated to streaming vocal utterance data. The metadata tags can include, e.g. topic tags specified topics defined within vocal utterance data. Processing at block 1106 can include activation of NLP process 112 to return metadata provided by NLP output parameters.

Returned metadata can include, e.g. topic tagging metadata, part of speech tagging metadata, phrase extraction metadata, and/or non-speech vocal utterance event metadata, such as may be returned when vocal utterance data is determined to represent, e.g. a cough or a sneeze. Non-speech vocal utterance event metadata, e.g. indicating the occurrence of a cough or a sneeze can include various forms of processing such as use of the Hilbert marginal spectrum, HMM EMD analysis, HMM recognition, time frequency distribution processing, and/or gamatone cepstral coefficients. Returned metadata returned by performance of NLP processing at block 1106 can be stored in data repository 108 at block 1082, e.g. into models area 2123 for use in training predictive models. On completion of block 1106 manager system 110 can proceed to block 1107.

At block 1107, manager system 110 can be receiving various data from client computer devices 130A-130Z sent by client computer devices 130A-130Z at block 1303. The data sent at block 1303 can include data for use by manager system 110 in detecting the addition of one or more item to an inventory list, the inventory list being a list of inventory items included in venue 120A. Data from client computer devices that can be sent at block 1303 can include, e.g. data from a shopping assistant application indicating purchases of a user, data from an online retail store application indicating purchases of a user, and data from a banking application indicating purchases of a user. Manager system 110 on completion of block 1107 can proceed to block 1108.

At block 1108, manager system 110 can be receiving data from IoT sensor system 150, social media system 160, and enterprise systems 170A-170Z. IoT sensor system 150, social media system 160, and enterprise systems 170A-170Z can be sending data for receipt by manager system 110 at block 1701. The data sent by components 150, 160, and 170A-170Z at block 1701 for receipt by manager system 110 at block 1108 can include, e.g. IoT sensor data from IoT sensor system 150, posts data from social media system 160, purchase receipt data from enterprise systems 170A-170Z, e.g. where some of such enterprise systems are enterprise systems providing online retail store services and financial account data from enterprise systems of enterprise systems 170A-170Z where such enterprise systems are provided by financial institutions. The data sent at block 1701 can be data for use by manager system 110 in detecting changes including additions to an item inventory associated to venue 120A. In response to receipt of data at block 1108, manager system 110 can proceed to block 1109.

At block 1109, manager system 110 can activate inventory count process 113 (FIG. 1) to perform inventory processing. Manager system 110 at block 1109 can perform processing of data received at block 1107 and block 1108 to determine changes in an item inventory associated to venue 120A. Manager system 110 can maintain an item inventory list of items acquired for a venue. Manager system 110 can detract from the list when items are consumed or removed from a venue and can add to the inventory list when items are acquired for a venue. For example, where an item is purchased and that purchase is detected by examining data of, e.g. a shopping assistant application of a client computer device, that purchase can be recorded as an addition to an inventory list that specifies a complete list of items acquired for venue 120A.

Additions to or deletions from inventory can be detected in ways other than data indicating a purchase transaction. For example, IoT sensor devices such as IoT sensor devices 150A-150C as depicted in FIG. 2 can be camera based. Image data captured with use of camera based IoT sensor devices can be processed to detect changes in spatial features associated to an environment, i.e. where new items are added to an environment and recognized. Accordingly, additions to an item inventory can be provided based on performance of spatial image processing. As depicted in FIG. 2, camera based IoT sensor devices can be disposed for detecting inventory additions with use of collected image data representing an entryway of a venue (IoT sensor device 150A), contents within a refrigerator (IoT sensor device 150B), and changes to a spatial environment within a cupboard (IoT sensor device 150C).

Manager system 110 performing inventory processing at block 1109 can include performance of processing to avoid double counting of an item. For example, a certain item can be recognized as being added to inventory by examination of purchase transaction information specified in a shopping application, purchase transaction information received from a user's banking application, purchase transaction information received from an online retail store enterprise system, purchase transaction information from a financial institution enterprise system, and the additional inventory item can be recognized by processing of image data collected with use of one or more camera sensor device, e.g. to determine that the new item is included within a venue.

Manager system 110 for avoiding a double count to inventory based on purchase transaction indicating data can exclude purchase transactions indicating common or closely associated having common product ID, price, transaction timestamp, and/or product description information and can avoid a counting a recognized new item recognized based on image data processing where a represented and recognized new item has the appearance of an item specified in purchase transaction data. Manager system 110 can determine appearance of a purchased item by entry of a product ID into a general search engine, for example.

Processing by manager system 110 at blocks 1105-1110 can be performed for a series of time periods. Time periods can be of various length, e.g. one minute, ten minutes, one hour, five hours, ten hours, or one day. For each time period, manager system 110 (block 1109) can generate a list of items added to inventory including item ID, price data, and description data, and for each time period can generate (block 1106) a record of returned metadata, e.g. topic metadata, part of speech metadata, extracted phrase metadata, and detected non-speech event metadata (e.g. indicating a cough or sneeze). On completion of block 1110, manager system 110 can proceed to block 1111 to perform machine learning training. At block 1111, manager system 110 can train a predictive model using data returned from the preceding inventory processing block 1109 and returned data returned by performance of processing block 1106 for a preceding time period.

Figure 5:
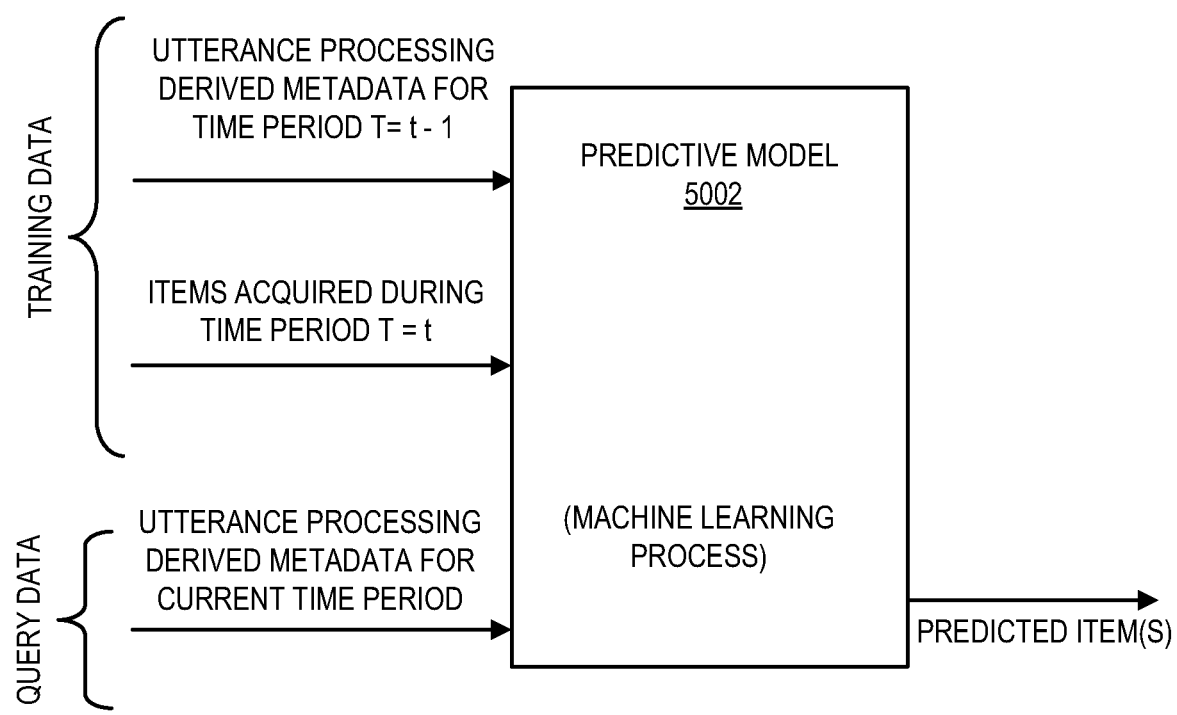
FIG. 5 depicts a predictive model that can be trained by machine learning processes according to one embodiment.

Referring to FIG. 5, predictive model 5002 is depicted. Predictive model 5002 can predict items that will be acquired by a set of users associated to a venue such as venue 120A. Manager system 110 can train predictive model 5002 with use of iteratively applied sets of training data, wherein a new set of training data can be applied for each new time period of a succession of time periods. An iteratively applied set of training data for each new time period of a succession of time periods can include (a) data specifying a list of items acquired during a time period T=t, which can be the most recent time period; and (b) vocal utterance processing derived metadata for the time period preceding time period T=t; namely, returned metadata for time period T=t−1 (the time period preceding the most recent time period). On being trained with training data that includes data of acquired item associated to utterance derived metadata for a preceding time period predictive model 5002 can learn relationships between utterances and item acquisitions that are subsequent to such utterances.

On completion of performance of inventory processing at block 1109 for each given time period manager system 110 can apply a new set of training data to predictive model 5002. Each new set of training data applied to predictive model 5002 can include (a) data of a list of added inventory items added to inventory for the time period, T=t, determined to be complete at block 1110 associated to (b) vocal utterance processing derived metadata for the preceding time period. T=t−1.

Trained with use of such training data, predictive model 5002 can learn a relationship between vocal utterance processing derived metadata and subsequent item acquisitions. Predictive model 5002, once trained, can be deployed for predicting acquired items. Predictive model 5002 once trained can be responsive to query data to generate a list of predicted one or more item that will be acquired. For return of a list of predicted acquired items, predictive model 5002 can be subject to a query with use of query data. The query data can include vocal utterance processing derived metadata for the current time period. On completion of machine learning training at block 1111, manager system 110 can proceed to block 1112 to perform predicting of one or more item that will be acquired by users associated with a venue, e.g. venue 120A.

For performing of predicting at block 1112, manager system 110 can apply the returned set of metadata returned by performance of processing block 1106. Based on it being trained using sets of training data, for a succession of time periods, that include (a) vocal utterance processing derived metadata for a preceding time period in combination with (b) data specifying items acquired during a successive time period, predictive model 5002 as set forth herein and trained according to machine learning processes as set forth herein can be trained to learn relationships between vocal utterances by users within a venue and subsequently acquired items by the users.

For example, where users can make vocal utterance based references to running low on milk and where such vocal utterances are followed by acquisitions of milk during a subsequent time period, predictive model 5002 can learn such trends and when presented with query data referencing milk related topics can predict the acquisition of milk during a subsequent time period. Where users coughing and sneezing during a first time period followed in practice by the acquisition of cough drops and a specific brand of cold medicine during a subsequent time period, predictive model 5002 trained by machine learning processes herein is able to learn such a relationship and can predict the acquisition of a particularly branded cough and cold medicine on being queried with metadata specifying coughing or sneezing events. Manager system 110 on completion of block 1112 can proceed to block 1113.

At block 1113, manager system 110 can return an action decision in dependence on a result of predicting at block 1112 and in some instances in dependence on other one or more criterion. Manager system 110 performing action decision block 1113 can include manager system 110 using a decision data structure, such as a decision data structure set forth in Table A.

TABLE A

| Row | FMV Scale | Prediction Confidence Level (in alternate embodiment predicted probability of acquisition) | Action Decision |
| --- | --- | --- | --- |
| 1 | 1 | C < 0.2 | Text notification to client computer devices 130A-130Z to remind user to acquire item |
| 2 | 1 | 0.2 ≤ C < 0.6 | Post to social media system 160 requesting gifting of item |
| 3 | 1 | 0.6 ≤ C < 0.7 | Row 2 + Row 3 actions plus |

TABLE A-continued

| Row | FMV Scale | Prediction Confidence Level (in alternate embodiment predicted probability of acquisition) | Action Decision |
| --- | --- | --- | --- |
| | | | reconfigure device applications |
| 4 | 1 | 0.7 ≤ C < 0.8 | Row 2 through Row 4 actions plus send notification to relevant enterprise |
| 5 | 1 | 0.8 ≤ C < 0.9 | Auto-purchase item for courier delivery |
| 6 | 1 | 0.9 ≤ C | Text notification to client computer devices 130A-130Z to remind user to acquire item |
| ... | ... | ... | ... |
| 28 | 5 | 0.3 ≤ C < 0.6 | Text notification to client computer devices 130A-130Z to remind user to acquire item; activate interactive session between user and VEPA 210 |
| 29 | 5 | 0.6 ≤ C < 0.7 | Text notification to client computer devices 130A-130Z to remind user to acquire item plus reconfigure device applications and send notification to relevant enterprise |
| 30 | 5 | 0.7 ≤ C < 0.8 | Row 29 actions plus location based messaging feature activated. |
| 31 | 5 | 0.8 ≤ C < 0.9 | Auto-purchase item for courier delivery (automatically ordered) |
| 32 | 5 | 0.9 ≤ C | Auto-purchase item and auto-deliver item via autonomous vehicle. |
| ... | ... | ... | ... |

Table A specifies a decision data structure wherein prediction confidence levels are cognitively mapped to action decisions. Predictive model 5002 can be configured so that when predictive model 5002 returns a prediction as to an item that will be acquired, predictive model 5002 returns a confidence level (e.g. on a scale of 0.0 to 1.0) associated with the prediction indicating the level of confidence that a prediction is accurate. The confidence level associated with the prediction can be in dependence, e.g. on the corpus size of datasets used for training of predictive model 5002. System 100 can alternatively or in addition return action decisions in dependence on predicted probability of item acquisition, and accordingly, in one embodiment, the column 3 data of Table A can refer to predicted probability of acquisition. Predictive model 5002 can be configured so that when predictive model 5002 returns a prediction as to an item that will be acquired, predictive model 5002 returns a value (e.g. on a scale of 0.0 to 1.0) indicating a probability that the item will be acquired and confidence level (e.g. on a scale of 0.0 to 1.0) associated with the prediction referring to the level of confidence that the prediction is accurate. According to one embodiment, the column 3 data of Table A refers to confidence level and associated to all firing conditions is the additional firing condition that a predicted probability of acquisition of an item is greater than 0.8 or another threshold value. It will be understood that action decisions can be dependent on predicted probability of acquisition and on confidence level.

Referring to Table A, action decisions can be in dependence on prediction confidence levels. For example, where prediction confidence level is less than 0.2 the action decision of "no action" can be returned. Further, where a confidence level associated with a prediction increases, different action decisions can be specified. For example, where there is a relatively low level of confidence associated with a prediction, the action decision returned with reference to row 2 can be the action decision to send a text notification to client computer devices 130A-130Z indicating that the item has been specified to be a predicted item for acquisition. When recording additions to an inventory list, manager system 110 has access to pricing information of an added inventory item.

As set forth in Table A, action decisions can be in dependence on predicted confidence levels associated with predictions as to acquisition of items and a fair market value (FMV) scale associated with the item where, for example, there can be a five scale hierarchy wherein items having an FMV scale classification 1 can be the lowest FMV priced items and where items having the FMV scale classification 5 can be the highest priced items.

As set forth in Table A, action decisions can be in dependence on a price classification of an item. For example, referring to row 32 of Table A, the action decision of auto-purchasing an item and auto-delivering the item to venue 120A via an autonomous vehicle can be specified as an action decision in the case of a higher priced item, but referring to row 6 may not be specified as to items having a lower price classification.

Referring to row 3, lower price classified items can have associated action decisions that may not be associated to higher priced items. For example, a returned action decision for the case of an item having an FMV scale classification of 1 and a confidence level associated with a predicted acquisition of ≥0.6 and <0.7 can return the action decision of "post to social media system requesting gifting of an item". That action decision, when returned, can result in an automated post to social media system 160 on behalf of one or more user associated to a venue, the post prompting, e.g. friends of the user to bring the item, e.g. a low priced item (such as a loaf of bread) to the venue of a user without charge (auto prompting gifting of the item).

Various other action decisions that are specified in Table A can include, e.g. an action decision to reconfigure a device application running on a client computer device 130A-130Z, such as a reconfiguration to introduce new entries into a shopping assistance application, e.g. that specifies items on a shopping list. Application reconfigurations specified as part of an action decision can include e.g. data update reconfiguration, and/or programming reconfigurations to change a functionality of a device application.

For example, where the action decision of row 4 of Table A is returned, that action decision can result in a communication being sent by manager system 110 to a client application running on a client computer device, e.g. client computer device 130A to automatically enter into a shopping assistance application running on that client computer device, a new entry on a shopping list; namely, a new entry specifying the item predicted to be acquired.

According to another example of reconfiguring a customer application, a communication can be sent to an application running on a client computer device to update preferences of a user in a customer loyalty application or in an online retail store application. Enterprises associated with such applications can read the data from the customer loyalty or retail store application which can result in new and different promotions being presented notification including promotions being sent to the user.

Referring to row 5, a returned action decision can be an action decision to send a communication to a relevant enterprise, such as an enterprise providing a product predicted for acquisition. As a result of the communication, a user associated to a venue predicted to experience an associated item acquisition can be placed on a new list where they are available for new notifications, including new promotions, e.g. involving the item predicted for acquisition. On completion of block 1113, manager system 110 can proceed to block 1114.

Regarding row 28, an action decision can include an action decision to activate an interactive session between VEPA 210 and a user to obtain more information as to whether the user intends to acquire an item as has been predicted for acquisition. When an interactive session is activated VEPA 210 (FIG. 2) can automatically enunciate a series of synthesized voice based questions specifying the item predicted for acquisition and a user (of client computer device 130A and 130B as shown in FIG. 2) can respond to the synthesized voice based questions. Manager system 110 can process responsive utterance data e.g. using NLP by activation of NLP process 112 to discern e.g. whether the user actually wishes to acquire the item. On receipt of positive confirming utterance data from a user, manager system can add the value K to the current prediction confidence level and reapply the decision data structure of Table A using the revised confidence level. As indcted in Table A, the interactive session feature may not be specified for all action decisions associated with all firing conditions but rather can be selectively activated for select firing conditions, such as firing conditions specified for items of a lower confidence level and a higher FMV classification as indicated in Table A according to one embodiment.

Regarding row 30, an action decision to activate a location based messaging feature can be selectively activated when the specified firing condition is present. In accordance with a location based messaging feature that can be activated, manager system 110 can be processing data specifying a current location of client computer devices 130A-130Z associated to venue 120A and can automatically send a text based notification to user for display on a client computer device of the user when the client computer device of the user breaches a geofence established about an enterprise venue having an item predicted for acquisition. The notification can prompt the user to travel to the enterprise venue to acquire the item. As indcted in Table A, the location based messaging feature may not be specified for all action decisions associated with all firing conditions but rather can be selectively activated for select firing conditions, such as firing conditions specified for items of a certain FMV classification as indicated in Table A.

At block 1114, manager system 110 can provide one or more output for the performance of a returned action decision returned at block 1113. Manager system 110 at block 1114 can send, e.g. notification data and/or application control data for receipt by client computer devices 130A-130Z at block 1304. Data received at block 1304 can include, e.g. data for presentment of a notification on a client computer device display, e.g. in notification area 4020 of user interface 4000 (FIG. 4) and/or can include application control data, e.g. reconfiguring a device application e.g. for updating a user profile associated with a customer loyalty application and/or an online retail store application. The updating can result in new and different interactions between the user and enterprises associated to the customer loyalty or online shopping applications. Application control data received at block 1304 can also include, e.g. control data to enter a reference to a new item into an application, e.g., the item predicted for acquisition into a shopping list of a shopping assistance application running on a client computer device.

At block 1114, manager system 110 can send data for receipt by one or more component 150, 160, and 170A-170Z. Such data can be received by one or more of component 150, 160, or 170A-170Z at block 1702. Data received at block 1702 can include such data as purchase order initiation data, e.g. for auto-initiation of a purchase order, profile data, e.g. profile data that changes a profile of a user where the user has an account associated with an enterprise such as an online retail store enterprise. The communication to a relevant enterprise specified in row 5 of Table A can be a communication to update a user's profile that is maintained by an enterprise for use in providing services to the user. Data received at block 1702 can also include, e.g. auto-post data so that a social media post is automatically entered under a user's account to social media system 160, e.g. a post to request by friends that a particular item be carried to and gifted to a user at the user's venue, e.g. as described in connection with row 3 of Table A. Data sent at block 1114 for receipt at block 1702 can include e.g. control data to automatically activate an autonomous vehicle, e.g. a land based or air based autonomous vehicle to deliver an item predicted for acquisition to venue 120A, as indicated in connection with the action decision of row 32 of Table A. In such a scenario an enterprise operating an enterprise systems 170A-170Z of enterprise systems 170A-170Z can be an online retailer having autonomous vehicle delivery capability. On completion of block 1114 manager system 110 can proceed to block 1115. Data sent at block 1114 for receipt at block for performance of an action decision can also include control data sent for receipt by VEPA 210 e.g. control data to activate an interactive session wherein manager system 110 via VEPA 210 acquires additional information respecting a predicted item for purchase e.g. to confirm that a user intends to acquire the item.

At block 1115, manager system 110 can return to block 1105 to receive additional vocal utterance data from VEPA 210.

According to one embodiment, predictive model 5002 as shown in FIG. 5, can be trained exclusively with use of vocal utterance data and item acquisition data associated to a certain venue, e.g. the certain venue 120A. Embodiments herein recognize that use of a predictive model trained with use exclusively of certain venue associated data can provide advantages. For example, the predictive model can be especially well adapted to respond with predictions that are customized to the special behaviors and tendencies of users within a group of users associated to a certain venue. However, for some types of vocal utterances and some types of items embodiments herein recognize use of training data associated with additional venues can be useful. For example, embodiments herein recognize that whereas some vocal utterance to item acquisition trends may have strong local tendencies, i.e. tied in specific ways to certain venues, e.g. certain households, other vocal utterance to item acquisition tendencies can have more universal characteristics, e.g. can exhibit trends that are universal across all venues, e.g. across all households.

Accordingly, system 100 in one embodiment can make use of multiple predictive models according to predictive model 5002 each trained with different training datasets. For example, a first instance of predictive model 5002 can be trained using only local training data, i.e. training data associated with a certain venue, e.g. the certain venue 120A. However, another instance of predictive model 5002 for use by manager system 110 in making predictions can be a predictive model trained with use of training data from all available venues—that is to say, all venues of venues 120A-120Z depicted in FIG. 1, which can be conceivably comprised of tens, hundreds, thousands, hundreds of thousands, or millions of venues.

Another advantage of using a more globalized training dataset, i.e. including venues 120A-120Z is that the available corpus of training data tends to be much larger which can increase, significantly, a confidence level associated to a prediction. When system 100 is first deployed with reference to a certain venue, e.g. venue 120A, it can be expected that confidence levels associated to predictions using an instance of predictive model 5002 trained with training data from all venues 120A-120Z can return higher levels of confidence than predictions returned using an instance of predictive model 5002, trained with local data only, i.e. training data associated to only a certain venue such as certain venue 120A. According to one embodiment, system 100 can be configured so that on initial deployment for servicing a certain venue e.g. venue 120A when a corpus of training data associated to venue is small e.g. does not exceed certain threshold volume, manager system 110 uses an instance of predictive model 5002 trained with global data from a global set of venues 120A-120Z for return of predictions as to item acquisitions. However, as the corpus of training data associated to venue grows e.g. exceeds the certain threshold, manager system 110 can use an instance of predictive model 5002 trained with local data exclusively of venue 120A for return of item acquisition predictions. The use of such predictive model 5002 trained with local data exclusively of venue 120A can be e.g. weighted (e.g. an instance of predictive model 5002 trained with global data can be used in combination with an instance of predictive model trained with local data on a weighted basis which is weighted more heavily toward the local data trained predictive model as the corpus of local training data increases in volume), or alternatively, can be exclusive (the instance of predictive model 5002 trained with global training data is not used after the corpus of local training data exceeds a threshold volume).

Where manager system 110 uses predictions returned with use of multiple instances of predictive models 5002, manager system 110 can use results having higher associated confidence levels or can aggregate results returned by different instances of predictive model 5002, e.g. can average the results or aggregate the results in another way, e.g. using a median, averaging with selective weighting, averaging with applied filters, and the like.

Embodiments herein recognize that some vocal utterance to item acquisition trends can exhibit a shorter time period lag between vocal utterance and acquisition whereas other vocal utterance to item acquisition trends can exhibit a longer time period lag between vocal utterance and item acquisition. For example, for some classifications of items, an acquisition of an item can tend to follow a vocal utterance to item acquisition time lag of e.g., of a few hours, a day or a half a day whereas for items of other item classifications an acquisition of the item can tend to follow a vocal utterance after a longer time period such as e.g. two days, a week, a month, or even a longer time period.

Embodiments herein recognize, for example, that for some classifications of items, e.g. higher FMV valued items, research into an acquisition can accompany an acquisition which can consume time. Embodiments herein recognize that instances of predictive model 5002 trained to predict trends over longer period time lags between vocal utterance and acquisition can be better suited for predicting acquisitions of higher valued items, and that instances of predictive model 5002 trained to predict trends over shorter period time lags between vocal utterance and acquisition can be better suited for predicting acquisitions of lower FMV valued items.

According to one embodiment, manager system 110 can instantiate M instances of predictive model 5002, trained with local training data only i.e. only data associated with the venue 120A and can instantiate N instances of predictive model 5002, trained with use of global training data, associated with all the venues 120A-120Z. For each of the M instances of predictive model 5002, duration of time period T is differentiated, i.e. for the first instance, i=1, can have a duration e.g. of 10 minutes and for the last instance, i=M, can have a duration of one year. The duration of the time period T can be increased for each instance. Likewise, for each of the N instances of predictive model 5002, the duration of the time period T is differentiated i.e. for the first instance i=1 can have a duration e.g. of 10 minutes and for the last instance, i=N, can have a duration of one year. The duration of the time period T can be increased for each instance.

Embodiments herein recognize that predictive model 5002 can be tuned to learn trends occurring over a certain period with use of training data having associated training data time periods selected to be in common with the certain period. By deployment of multiple different instances of predictive model 5002, each trained using different training data time periods, manager system 110 can be configured to return predictions as to utterance dependent item acquisition having a range of time lags between utterance and acquisition.

As set forth in reference to FIG. 5, the duration of time period T can establish the period of interest for selection of training data for use in training predictive model 5002. Predictive model 5002 trained with shorter duration time periods can be better adapted for predicting vocal utterance to item acquisition trends, where there is a shorter term lag between a vocal utterance and an item acquisition, whereas instances of predictive model 5002, having longer durations for the time period T, can be better adapted for predicting item acquisitions in cases where a vocal utterance to item acquisition trend exhibits a longer time lag between vocal utterance and item acquisition.

Manager system 110 can use additional or alternative processes to perform predictions as to item acquisitions including processes that do not include use of vocal utterance data. According to one embodiment, manager system 110 can predict that items will be acquired based on processed image data using image data collected with use of deployed IoT sensor devices that are camera based such as IoT sensor devices 150A-150C as shown in FIG. 2. According to one alternative predictive model that is an alternative to predictive model 5002, manager system 110 can monitor an inventory of items within item storage locations such as a refrigerator or a cupboard as indicated in FIG. 2 in the home residence example and can return predictions as to acquired items by examining image data associated with all item storage locations within a venue such as venue 120A (FIG. 2). Manager system 110 with use of one certain predictive model can predict that an item inventory will be maintained at a baseline, i.e. steady state inventory level as a desired inventory level. When items are removed from an item inventory storage location, e.g. a refrigerator or cupboard, and a sum set of all similar storage locations, manager system 110 with use of the certain predictive model described can predict that an acquisition a replacement item will take place to maintain the inventory of items at a baseline value.

For performing of predicting at block 1112, manager system 110 according to one embodiment can apply the formula of Eq. 1 as set forth hereinbelow.

$$P = P_A W_A + P_B W_B + P_C W_C \qquad (\text{Eq. 1})$$

Where $P_A$, $P_B$, and $P_C$ are predictions as to acquisition of an item performed with use of different predictive models and $W_A$-$W_C$ are weights associated with different predictive models and where P is a returned prediction as to an acquisition of an item. According to one embodiment, $P_A$ can refer to the prediction performed using a first instance of predictive model 5002 as shown in FIG. 5 trained using local training data only, i.e. only data associated with a certain venue such as venue 120A, $P_B$ is a prediction returned using an instance of predictive model 5002 training using global training data, i.e. associated to all venues 120A-120Z, and where $P_C$ is a predictive model that predicts an item acquisition in dependence on image data processing of image data collected with use of IoT sensor system 150, e.g. which can include camera based IoT sensor devices 150A-150C, as shown in FIG. 2, and which can apply the certain predictive model herein wherein an inventory of items is predicted to be maintained at a constant baseline level.

For performing of predicting at block 1112, manager system 110 according to one embodiment can apply the formula of Eq. 2 as set forth hereinbelow.

$$P = P_{A1} W_{A1} + P_{A2} W_{A2} + \ldots P_{B1} W_{B1} + P_{B1} W_{B1} + \ldots P_C W_C \qquad (\text{Eq. 2})$$

Where $P_{A1}$, $P_{A2}$, $P_{B1}$, $P_{B2}$, $P_C$ are predictions as to acquisition of an item performed with use of different predictive models and $W_{A1}$, $W_{A2}$, $W_{B1}$, $W_{B2}$, $W_C$ are weights associated with different predictive models and where P is a returned prediction as to an acquisition of an item.

According to one embodiment, $P_{A1}$ can refer to the prediction performed using a first instance of predictive model 5002 as shown in FIG. 5 trained using local training data only, i.e. only data associated with a certain venue such as venue 120A and using a first training data time period. $P_{A2}$ can refer to the prediction performed using a first instance of predictive model 5002 as shown in FIG. 5 trained using local training data only, i.e. only data associated with a certain venue such as venue 120A and using a second training data time period. $P_{B1}$ can be a prediction returned using an instance of predictive model 5002 training using global training data, i.e. associated to all venues 120A-120Z, and trained using a first training data time period. $P_{B2}$ can be a prediction returned using an instance of predictive model 5002 training using global training data, i.e. associated to all venues 120A-120Z, and trained using a second training data time period. $P_C$ can be a predictive model that predicts an item acquisition in dependence on image data processing of image data collected with use of IoT sensor system 150, e.g. which can include camera based IoT sensor devices 150A-150C, as shown in FIG. 2, and which can apply the certain predictive model herein wherein an inventory of items is predicted to be maintained at a constant baseline level. Eq. 2 can be expanded so that there are M different predictions using instances of predictive model 5002 trained using local data with M different training data time periods, and/or N different predictions using instances of predictive model 5002 trained using global data with N different training data time periods.

System 100 according to one embodiment can be configured to replenish supplies based on audio analysis. Embodiments herein recognize that there are times during daily routines that individuals make statements or sounds that can be taken as an indicator that an item is needed. These can come from innocent comments such as "I just took the last box of widgets" to a person physically sneezing. Remembering to add an item to a shopping list requires an overt action to be taken by a user. Embodiments herein can feature analyzing sounds and words using a device e.g. device 200 (FIG. 2) that can be an always on listening device according to one embodiment. Once system 100 recognizes the possible need for a item it can search the inventory for that item at your defined physical location. If you have more inventory than you are aware of currently on hand, it can tell you where to find it. If a user is predicted to acquire an item, system 100 can e.g. add the item to a user shopping list and/or automatically reorder in a quantity based on your historical usage rate.

Embodiments herein can capture audio input using an always on listening device e.g. a voice enabled personal assistant (VEPA).) System 100 can cognitively analyze the input, be that words or sounds, to identify items that may be replenished. Embodiments herein recognize that there will be a natural language link on an interpreted need to a desire to replenish a item. Once the need is identified by predictive analytics, system 100 can respond in various ways so that an item is acquired, e.g. via activating an auto-purchase, activating a social media post, activating delivery by an autonomous vehicle, automatically augmenting a shopping list of a shopping list applications, activating a location based messaging feature, activating interactions with the user so obtain further information about the item, and/or sending a notification to prompt the acquisition of the item.

An always on listening device can capture natural human sounds (with or without a wake word). An always on listening device also captures voice (with or without a wake word). NLP can be used to analyze words, while other cognitive analysis is used to analyze sounds (e.g. sneezing or coughing). System 100 can predict an item for acquisition including with reference to the current inventory of that item already possessed. System 100 can feature a listening device interacting with a user to understand if they need more, need help finding the item, or want to eventually get more. Based on the responses, system 100 can (a) tell the person where the item is in a venue (b) add it to a shopping list (as it would today with a digital personal assistant) (c) auto-order it online, using historical volumes as a suggested amount to order.

EXAMPLE 1

Jeremy picks up a box of pasta from the pantry and says "that's the last box of pasta". The always on listening device asks him if he wants to reorder it or put it on his shopping list. When Jeremy says reorder, system 100 suggests 3 boxes since that was the volume of his last order. Jeremy changes the order to 4 boxes via an audio command interface and the order is automatically submitted.

End of Example 1

EXAMPLE 2

Mike sneezes constantly. System 100 is capturing this and correlates sneezing to antihistamines and tissues. System 100 asks Mike if he wants to reorder either and Mike says to just put the tissues on his shopping list. The electronic shopping list is updated. Additionally, system 100 was able to verify that the quantity on hand was starting to run low, but did not reach the low quantity trigger point just yet.

End of Example 2

EXAMPLE 3

Kulvir picks up the last container of milk and says "Do we have any more milk". System 100 captures the audio and tells Kulvir that there is another container in the downstairs smart IoT based refrigerator, that is able to track the items within the refrigerator.

End of Example 3

There is set forth herein a method for an electronic device that has listening capabilities to interact with a system that: (a) captures and interprets sounds and words (from a User) (b) associates those sounds and words with a item need (through a learning corpus of knowledge); and (c) can interact with an individual user in respect to an item predicted for acquisition.

An always on listening device captures all audio. Audio can be categorized as words or background noise. Words can be processed to identify an item that is referenced using NLP. Background noise can be processed to identify item that is needed based on non-verbal communications. Words that are associated with a need can be compared to historical purchases. Sounds can be associated with condition that is cross-referenced with an association table. Items predicted for acquisition can be confirmed using an interactive conversation with the always on listening device. Items that are available can be identified to the individual via home inventory lookup. Items that are requested to be added to a shopping list can be added. Items that are requested to be ordered can be compared to previous orders. A volume of reorder can be specified through an interactive conversation mediated by a listening device between a listening device e.g. VEPA 210 and a user.

Certain embodiments herein may offer various technical computing advantages involving computing advantages to address problems arising in the realm of computer networks and computer systems. A fundamental aspect of operation of a computer system is its interoperation to which it operates including human actors. By increasing the accuracy and reliability of information presented to human users, embodiments herein increase the level of engagement of human users for enhanced computer system operation. Embodiments herein can receive and process input from a user passively and can use passively received data to drive artificial intelligence action decisions, which can include actions decisions to activate various processes, e.g. activation of autonomous vehicles and location based services (LBS). Embodiments herein can feature the passive acquisition of vocal utterance data representing vocal utterances of users within a venue. Natural Language Processing (NLP) can be employed for processing of vocal utterance data and for return of metadata of various forms. Embodiments herein can employ artificial intelligence (AI) to return action decisions, e.g. action decisions to update user profiles or automated processes to automatically activate item purchases, alleviating computer systems from resource utilization associated with manual entry of data by users. Certain embodiments herein may offer various technical computing advantages involving computing advantages to address problems arising in the realm of computer systems and networks and particularly computer systems and computer networks operating to provide location based services (LBS). Various decision data structures can be used to drive artificial intelligence (AI) decision making, such as decision data structures that cognitively maps prediction confidence levels and item FMV values to differentiated action decision. Decision data structures as set forth herein can be updated by machine learning so that accuracy and reliability is iteratively improved over time without resource consuming rules intensive processing. Machine learning processes can be performed for increased accuracy and for reduction of reliance on rules based criteria and thus reduced computational overhead. According to one machine learning process that can be employed a predictive model can be iteratively trained using training data comprising utterance processing derived metadata associated to data of item acquisitions. A trained predictive model trained by machine learning can learn various trends such as dependencies of item acquisitions on vocal utterances. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as camera sensors and weight sensor mounted in multiple locations. Embodiments herein can include artificial intelligence processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a software as a service (SAAS), platform as a service (PAAS), database as a service (DBAAS), and combinations thereof based on types of subscription the static optimization service may be provided for subscribed business entities and/or individuals in need for any location in the world.

Figure 6:
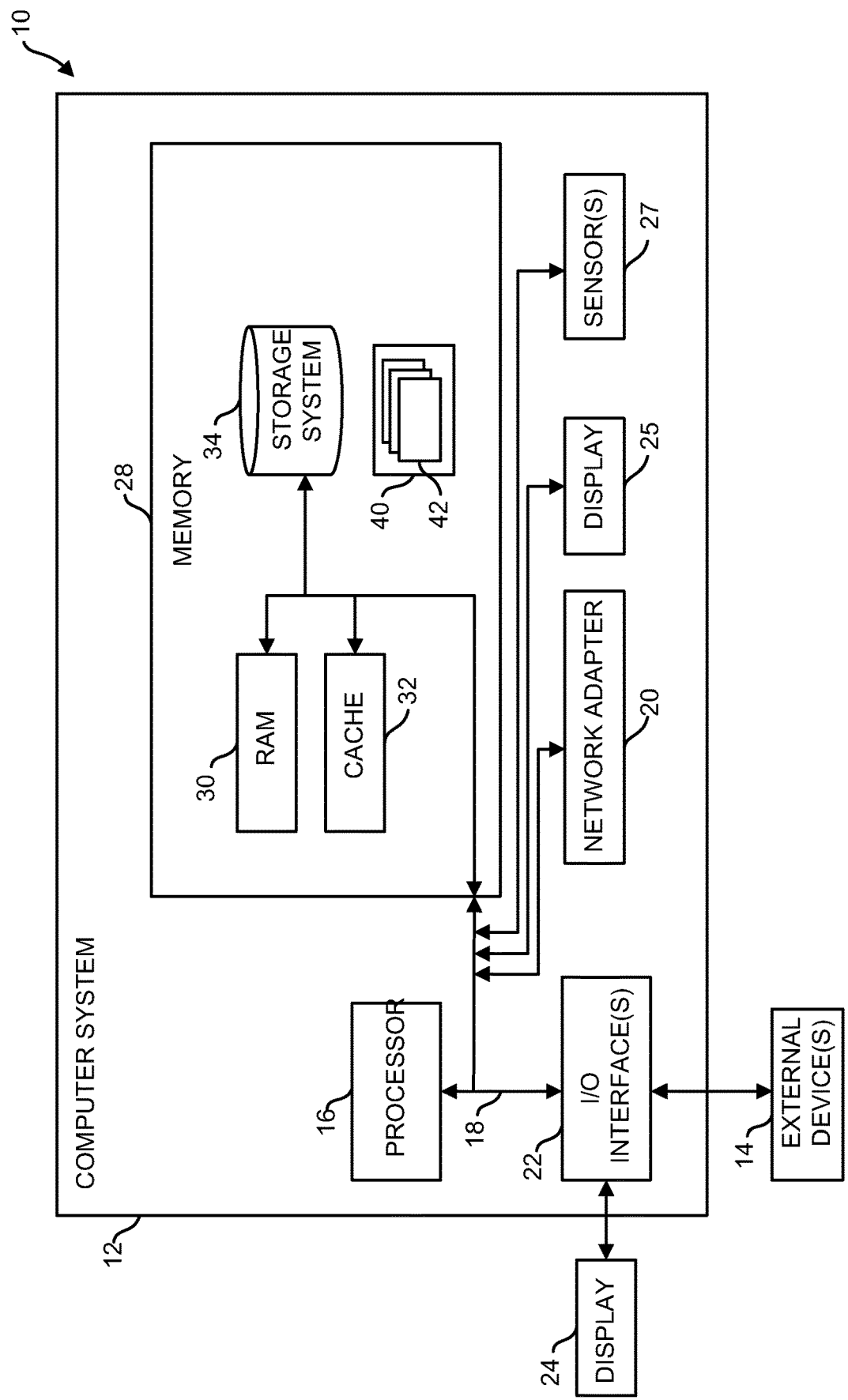
FIG. 6 depicts a computing node according to one embodiment.
Figure 7:
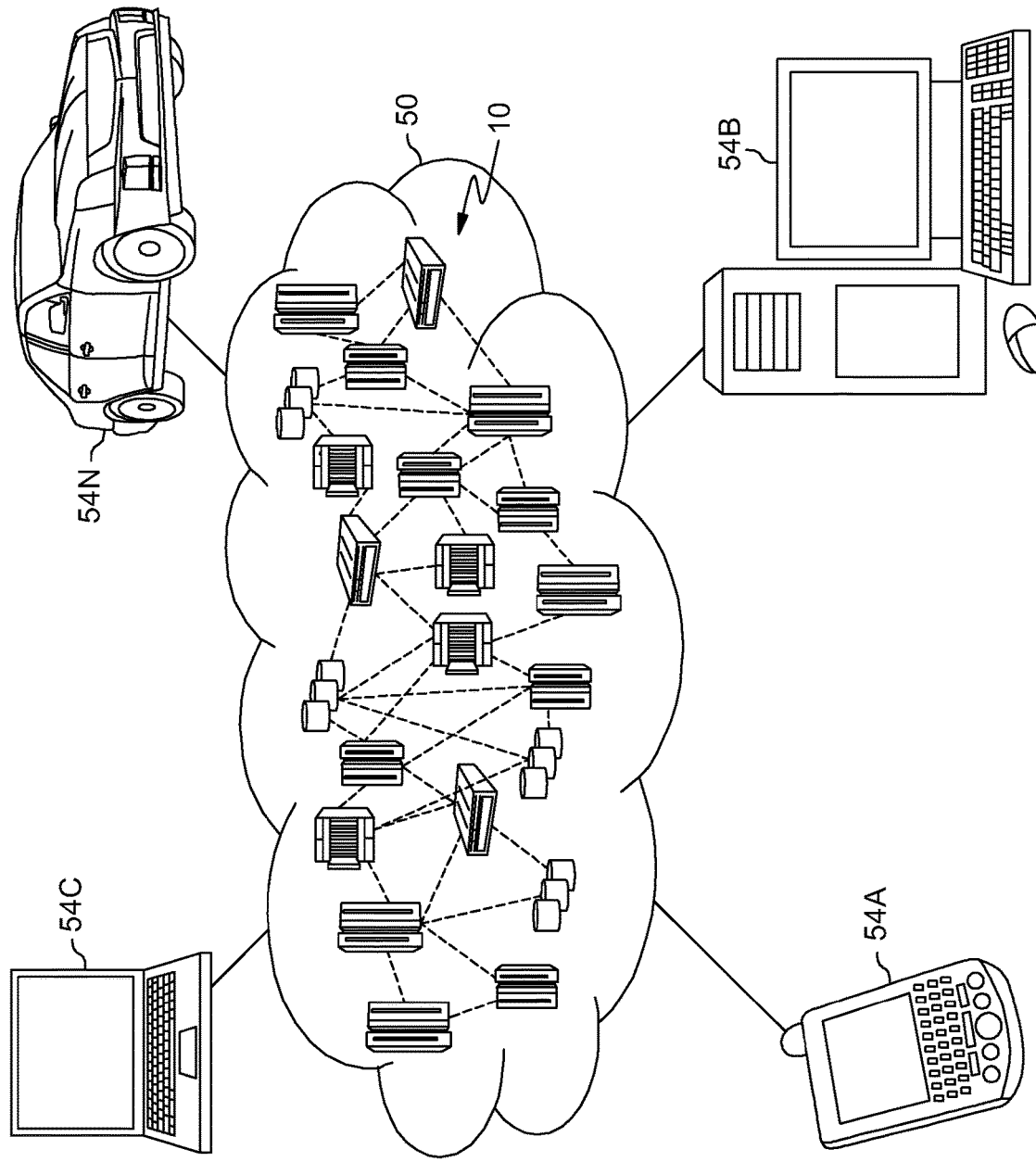
FIG. 7 depicts a cloud computing environment according to one embodiment.
Figure 8:
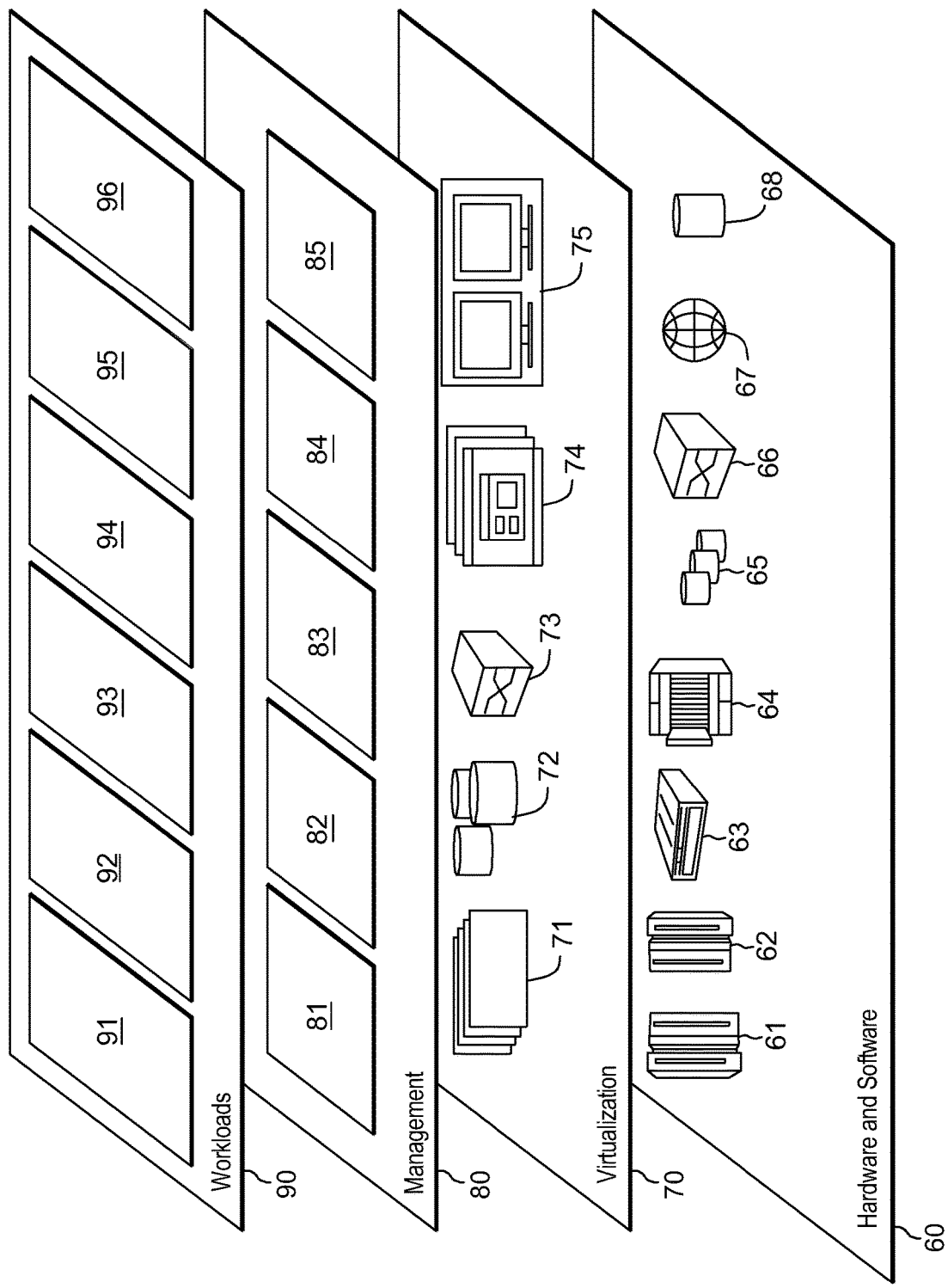
FIG. 8 depicts abstraction model layers according to one embodiment.

FIGS. 6-8 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 6, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 7-8.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to functions described with reference to manager system 110 as set forth in the flowchart of FIG. 3. In one embodiment, one or more client computer device 130A-130Z can include one or more computing node 10 and can include one or more program 40 for performing functions described with reference to one or more client computer device 130A-130Z as set forth in the flowchart of FIG. 3. In one embodiment, VEPA 210 can include one or more computing node 10 and can include one or more program 40 for performing functions described with reference to VEPA 210 as set forth in the flowchart of FIG. 3. In one embodiment, systems 150, 160, 170A-170Z can include one or more computing node 10 and can include one or more program 40 for performing functions described with reference to systems 150, 160, 170A-170Z as set forth in the flowchart of FIG. 3. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 7 computing node 10 is described as being implemented in a cloud computing environment and accordingly is referred to as a cloud computing node in the context of FIG. 7.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for processing vocal utterance data for return of action decisions as set forth herein. The processing components 96 can be implemented with use of one or more program 40 described in FIG. 7.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

The invention claimed is:

1. A computer implemented method comprising:
obtaining, using one or more audio input device, vocal utterance data representing vocal utterances of multiple users within a venue;
processing the vocal utterance data representing vocal utterances of the multiple users within the venue to return metadata associated to the vocal utterance data representing vocal utterances of the multiple users within the venue;
predicting using the metadata items for acquisition by respective ones of the multiple users; and
returning action decisions in dependence on the predicting.

2. The computer implemented method of claim 1, wherein the action decision includes an action to activate an interactive session between a voice enabled device and a user of the multiple users, wherein vocal utterance responses of the user are captured by the voice enabled device and processed in response to synthesized voice prompts presented by the voice enabled device.

3. The computer implemented method of claim 1, wherein the action decision includes an action to activate automated delivery of the item to the venue by an autonomous vehicle.

4. The computer implemented method of claim 1, wherein the action decision includes an action to activate an automated social media post on behalf of a user of the multiple users, the social media post referencing the item for acquisition.

5. The computer implemented method of claim 1, wherein the predicting includes predicting using the metadata a plurality of different items for acquisition by one or more user of the multiple users, and wherein the returning an action decision includes returning differentiated action decisions in dependence on the predicting, the differentiated action decisions being differentiated in dependence on: (a) respective fair market values associated to the different items for acquisition; (b) respective confidence levels associated to respective predictions of item acquisitions for the respective different items, and (c) respective probabilities of acquisition associated to respective predictions of item acquisitions for the respective different items, wherein the differentiated action decisions include an action to activate an interactive session between a voice enabled device and a user of the multiple users, wherein vocal utterance responses of the user are captured by the voice enabled device and processed in response to synthesized voice prompts presented by the voice enabled device, an action to automatically initiate a purchase transaction of the item for acquisition, an action to activate automated delivery of the item to the venue by an autonomous vehicle, and an action to activate an automated social media post on behalf of a user of the multiple users, the social media post referencing the item for acquisition.

6. The computer implemented method of claim 1, wherein the predicting includes using a predictive model, wherein the predictive model has been trained using iteratively applied sets of training data wherein respective sets of the iteratively applied sets of training data include: (a) data specifying a list of items acquired during a time period T=t; and (b) vocal utterance processing derived metadata for the time period T=t−1 preceding time period T=t.

7. The computer implemented method of claim 1, wherein the predicting includes using a predictive model, wherein the predictive model has been trained using historical metadata associated to historical vocal utterances, and data of historical inventory item changes associated to the venue.

8. The computer implemented method of claim 1, wherein the predicting includes using a first predictive model, and a second predictive model, wherein the first predictive model has been trained using iteratively applied sets of training data that include (a) data of observed item acquisitions for a venue for a certain time period combined with (b) utterance data derived metadata for a time period preceding the certain time period, wherein the second predictive model uses IOT sensor data to monitor a physical presence of items in an item storage location within the venue, and wherein the second predictive model has been configured to predict that an item inventory will be maintained at a constant baseline level.

9. The computer implemented method of claim 1, wherein the method includes obtaining inventory change indicating data from multiple data sources, processing the inventory change indicating data to determine an inventory change in an item inventory associated to the venue, and applying the inventory change as training data for training a predictive model used for performance of the predicting, wherein the multiple data sources include (a) an enterprise system provided by an online retail store used by a user of the multiple users, and (b) an IOT sensor system that includes an IOT sensor device disposed to sense a physical presence of items within a storage location of the venue.

10. The computer implemented method of claim 1, wherein the method includes obtaining inventory change indicating data from multiple data sources, processing the inventory change indicating data to determine an inventory change in an item inventory associated to the venue, and applying the inventory change as training data for training a predictive model used for performance of the predicting, wherein the multiple data sources include (a) client computer devices associated with respective ones of the multiple users within the venue, and an IOT sensor system having multiple IOT sensor devices distributed within the venue.

11. The computer implemented method of claim 1, wherein the processing the vocal utterance data to return metadata associated to the vocal utterance data includes using processing to return non-speech event vocal utterance metadata associated to the vocal utterance data, the non-speech event vocal utterance metadata indicating an occurrence of a non-speech vocal utterance event.

12. The computer implemented method of claim 1, wherein the processing the vocal utterance data to return metadata associated to the vocal utterance data includes using Natural Language Processing to return topic metadata associated to the vocal utterance data, wherein the processing the vocal utterance data to return metadata associated to the vocal utterance data includes using processing to return non-speech event vocal utterance metadata associated to the vocal utterance data, the non-speech event vocal utterance metadata indicating an occurrence of a non-speech vocal utterance event, wherein the predicting using the metadata includes predicting that a first item will be acquired for the venue in dependence on topic metadata of the metadata, and wherein the predicting using the metadata includes predicting that a second item will be acquired for the venue in dependence on non-speech event vocal utterance metadata of the metadata.

13. The computer implemented method of claim 1, wherein the predicting includes predicting using the metadata a, plurality of different items for acquisition by one or more user of the multiple users, and wherein the returning an action decision includes returning differentiated action decisions in dependence on the predicting, the differentiated action decisions being differentiated in dependence on: (a) respective fair market values associated to the different items for acquisition; and (b) respective probabilities of acquisition associated to respective predictions of item acquisitions for the respective different items, wherein the differentiated action decisions include an action to activate an interactive session between a voice enabled device and a user of the multiple users, wherein vocal utterance responses of the user are captured by the voice enabled device and processed in response to synthesized voice prompts presented by the voice enabled device, an action to automatically initiate a purchase transaction of the item for acquisition, an action to activate automated delivery of the item to the venue by an autonomous vehicle, and an action to activate an automated social media post on behalf of a user of the multiple users, the social media post referencing the item for acquisition, wherein the predicting includes using a predictive model, wherein the predictive model has been trained using historical metadata associated to historical vocal utterances, wherein the historical metadata associated to historical vocal utterances includes historical metadata associated to the venue and historical metadata associated to a plurality of venues external the venue, wherein the predictive model has been trained using iteratively applied sets of training data that include (a) data of observed item acquisitions for a venue for a time period T=t combined with (b) utterance data derived metadata for a time period, T=t−1, preceding the time period T=t, wherein the processing the vocal utterance data to return metadata associated to the vocal utterance data includes using Natural Language Processing to return topic metadata associated to the vocal utterance data, wherein the processing the vocal utterance data to return metadata associated to the vocal utterance data includes using processing to return non-speech event vocal utterance metadata associated to the vocal utterance data, the non-speech event vocal utterance metadata indicating an occurrence of a non-speech vocal utterance event, wherein the predicting using the metadata includes predicting that a first item will be acquired for the venue in dependence on topic metadata of the metadata, and wherein the predicting using the metadata includes predicting that a second item will be acquired for the venue in dependence on non-speech event vocal utterance metadata of the metadata.

14. A computer program product comprising:
a computer readable storage medium readable by one or more processing circuit and storing instructions for execution by one or more processor for performing a method comprising:
obtaining, using one or more audio input device, vocal utterance data representing vocal utterances of multiple users within a venue;
processing the vocal utterance data representing vocal utterances of the multiple users within the venue to return metadata associated to the vocal utterance data representing vocal utterances of the multiple users within the venue;
predicting using the metadata items for acquisition by respective ones of the multiple users; and
returning action decisions in dependence on the predicting.

15. A system comprising:
a memory;
at least one processor in communication with the memory; and
program instructions executable by one or more processor via the memory to perform a method comprising:
obtaining, using one or more audio input device, vocal utterance data representing vocal utterances of multiple users within a venue;
processing the vocal utterance data representing vocal utterances of the multiple users within the venue to return metadata associated to the vocal utterance data representing vocal utterances of the multiple users within the venue;
predicting using the metadata items for acquisition by respective ones of the multiple users; and
returning action decisions in dependence on the predicting.

16. The system of claim 15, wherein the predicting includes using a predictive model, wherein the predictive model has been trained using historical metadata associated to historical vocal utterances, and data of historical household item inventory changes associated to a home residence venue.

17. The system of claim 15, wherein the predicting includes using a predictive model, wherein the predictive model uses sensor data to monitor a physical presence of in-residence household items in a household item storage location within a home residence venue, and wherein the predictive model has been configured to predict that that an inventory of items in the household item storage location will be maintained at a constant baseline level.

18. The computer implemented method of claim 1, wherein the predicting includes predicting using the metadata a plurality of different items for acquisition by one or more user of the multiple users, and wherein the returning an action decision includes returning differentiated action decisions in dependence on the predicting, the differentiated action decisions being differentiated in dependence on respective confidence levels associated to respective predictions of item acquisitions for the respective different items.

19. The computer implemented method of claim 1, wherein the processing the vocal utterance data to return metadata associated to the vocal utterance data includes using processing so that the metadata includes non-speech event vocal utterance metadata indicating an occurrence of a non-speech vocal utterance event, wherein the predicting using the metadata includes predicting that the item will be acquired by the one or more user for the venue in dependence on the non-speech event vocal utterance metadata of the metadata.

20. The computer implemented method of claim 1, wherein the predicting includes using a predictive model, wherein the predictive model uses sensor data to monitor a physical presence of items in an item storage location within the venue, and wherein the predictive model has been configured to predict that an item inventory in the item storage location will be maintained at a constant baseline level.

* * * * *